(12) United States Patent
Long et al.

(10) Patent No.: US 9,082,192 B2
(45) Date of Patent: Jul. 14, 2015

(54) TEXT IMAGE TRIMMING METHOD

(75) Inventors: Teng Long, Shanghai (CN); Bin Zhang, Shanghai (CN); Xiping Luo, Shanghai (CN)

(73) Assignee: INTSIG INFORMATION CO., LTD, Shanghai (CN)

( * ) Notice: Subject to any disclaimer, the term of this patent is extended or adjusted under 35 U.S.C. 154(b) by 0 days.

(21) Appl. No.: 13/992,383

(22) PCT Filed: Aug. 2, 2011

(86) PCT No.: PCT/CN2011/077914
§ 371 (c)(1),
(2), (4) Date: Jun. 7, 2013

(87) PCT Pub. No.: WO2012/075817
PCT Pub. Date: Jun. 14, 2012

(65) Prior Publication Data
US 2013/0251262 A1   Sep. 26, 2013

(30) Foreign Application Priority Data

Dec. 10, 2010   (CN) .......................... 2010 1 0583973

(51) Int. Cl.
*G06K 9/34*  (2006.01)
*G06T 7/00*  (2006.01)
*G06K 9/32*  (2006.01)

(52) U.S. Cl.
CPC ............... *G06T 7/0083* (2013.01); *G06K 9/32* (2013.01); *G06K 9/325* (2013.01)

(58) Field of Classification Search
USPC .......... 382/173, 176, 254, 276, 277; 358/400, 358/403, 474, 505; 715/209, 276; 399/81
See application file for complete search history.

(56) References Cited

U.S. PATENT DOCUMENTS

| 4,764,789 | A  | * | 8/1988  | Iwaki et al. ..................... 399/81 |
| 7,685,517 | B2 | * | 3/2010  | Tomita et al. ................. 715/276 |
| 7,839,543 | B2 | * | 11/2010 | Watanuki ...................... 358/474 |

(Continued)

FOREIGN PATENT DOCUMENTS

| CN | 1937698 A   | 3/2007 |
| CN | 101425142 A | 5/2009 |

(Continued)

OTHER PUBLICATIONS

Bu et al., "Edge Detection Based Image Segmentation Method for Multi Sheet of Papers in One Image," *Computer Engineering and Design*, Apr. 30, 2007, vol. 28, No. 8, pp. 1861-1863 (with abstract).
He, Zhi-ming, "Rectification of Perspective Document Image Captured by Digital Camera," *Journal of Shanghai University of Engineering Science*, Sep. 30, 2007, vol. 21, No. 3, pp. 260-264 (with abstract).
International Search Report issued in International Patent Application No. PCT/CN2011/077914 mailed Nov. 17, 2011.

(Continued)

*Primary Examiner* — Amir Alavi
(74) *Attorney, Agent, or Firm* — Oliff PLC

(57) ABSTRACT

A text image trimming method, according to the following steps: step 1, obtaining text image data; step 2, using straight line detection method to detect the straight lines of the text image, obtaining edges of a trimmed quadrangle; step 3, detecting text on the image data, obtaining the coordinates of the boundary points of a text region; and step 4, obtaining the final trimming result according to the results of steps 2 and 3. The method can automatically detect the edges of the text region and utilize the detected text region to verify and remove unrelated redundant information thereby, allowing the user to only see the portion containing the text region useful to the user when viewing image data.

5 Claims, 3 Drawing Sheets

(56) References Cited

U.S. PATENT DOCUMENTS

| | | |
|---|---|---|
| 2004/0165786 A1 | 8/2004 | Zhang et al. |
| 2005/0078192 A1 | 4/2005 | Sakurai et al. |
| 2007/0132862 A1 | 6/2007 | Akasawa |
| 2010/0073402 A1 | 3/2010 | Delia et al. |
| 2013/0251262 A1* | 9/2013 | Long et al. .................... 382/176 |

FOREIGN PATENT DOCUMENTS

| | | |
|---|---|---|
| CN | 101593277 A | 12/2009 |
| EP | 1696383 A2 | 8/2006 |
| JP | 2009-200622 A | 9/2009 |

OTHER PUBLICATIONS

Dec. 2, 2014 European Search Report issued in European Application No. 11846097.1.

Feb. 28, 2013 Second Office Action issued in Chinese Patent Application No. 201010583973.4.

Gang Hua et al. "Automatic Business Card Scanning with a Camera", Image Processing, 2006 IEEE International Conference on, IEEE, PI, Oct. 1, 2006, pp. 373-376.

Mollah AF et al., "A Fast Skew Correction Technique for Camera Captured Business Card Images", India Conference, 2009 Annual IEEE, IEEE Piscataway, NJ, USA, Dec. 18, 2009.

First Search Report from SIPO (not dated).

* cited by examiner

TEXT IMAGE TRIMMING METHOD

This application is a 371 of PCT/CN2011/077914 filed on Aug. 2, 2011.

BACKGROUND OF THE PRESENT INVENTION

1. Field of Invention

The present invention belongs to image-processing field, relates to a text image processing method, and especially relates to a text image trimming method.

2. Description of Related Arts

Digital Camera (DC) is becoming more and more popular these years, at present, built-in DC is standard feature of a cellphone. These digital imaging devices are often used to shoot text images. Text image means the image contains one or more lines of printed text, such as image of a business card, a menu, a bill or a note .etc. The image taken by DC is different from that scanned by scanner, the differences includes, for example, that the image taken by DC is less clearer, the image taken by DC could be distortional because of the projection deformation of the subject such as business card, and the images taken by DC could also contain content or background other than the desired subject. Because of shooting habits or framing demands, the text image shot by user usually contains background, while what is needed is the text image without the background, just like the image scanned by a scanner.

There have been applications that can separate text image from its background, for example, the mobiReader, a business card editing software from the Apple's app store. It defines a preview area, and requires that user put the business card right in the preview area before shooting to obtain an image that only contains the content of the business card, then the effect of trimming can be achieved. However, this is a manual trimming method. There are other applications, such as the genius Scan from the Apple's app store, that can gain text region by using straight line detection method in image processing field because the shapes of the text images, for example, images of business cards, menus, bills or notes, are quadrangle with clear edge.

But when the text contains straight lines, the above-mentioned method may recognize the straight lines in the text as the edge of the text by mistake. With regards to this kind of images, other certain clues can be helpful to gain text image area, increase the accuracy of detecting the text region, and guarantee the trimming effect.

Regardless of whether a text image was taken by DC or scanned by a scanner, existing software, such as business-card-recognizing software or OCR software in the scanner, can detect and recognize the text in the text image.

SUMMARY OF THE PRESENT INVENTION

The object of the invention is to provide a text image trimming method which can automatically detect the edge of text region, verify and correct the edge according to the detected text region by using text-recognizing method, drastically increase the accuracy of text-area-detecting, thus eliminate redundant information and provide user the valuable parts that only contains text region when the user view the text image.

To achieve the above-mentioned objects, the present invention provides the following technical solution:

A text image trimming method, comprising the following steps:
i) obtaining text image data;
ii) detecting straight lines in the text image by a method of straight line detection, obtaining the edges of a trimmed quadrangle;
iii) detecting text in the image data, and obtaining the coordinates of the boundary points of the text region;
iv) obtaining the final trimming result according to the results of steps ii) and iii) and
v) end of the method.

As a preferred embodiment, the step iv) comprises following steps:
a) forming a set of candidate quadrangles that composed of all the quadrangles obtained in the step ii);
b) if the set of candidate quadrangles is empty, go to step f), otherwise, go to step c);
c) selecting a candidate quadrangle from the set of candidate quadrangles;
d) determining if all the edge points of the text region are in the candidate quadrangle, if they are, judge the candidate quadrangle to be valid trimmed quadrangle and go to step e), if they are not, go to step b);
e) returning to the valid trimmed quadrangle;
f) returning the valid trimmed quadrangle to user for manually determining trimmed quadrangle.

As a preferred embodiment, the method of obtaining image data in the step i) comprises one of the following three methods:
A: taking the image by a DC;
B: scanning the image by a scanner;
C: opening an existing file that contains image data, reading the data in the file and decompressing the data with a standard algorithm.

In order to realize the present invention, the following hardware is needed: A device with general computing and storing devices, including CPU with a certain frequency, a memory used for computing, and a storing space used for storing system software, application software and all kinds of data. If the image is taken by a DC or scanned by a scanner, DC or scanner is needed. Given text image data that need to be preserved or viewed, the present invention automatically detects the edge of the text region, use text detection method to detect text region and validate and correct the edge according to the detected text region, thus the accuracy of detecting the edge of the text region is drastically increased.

The beneficial effects of the invention comprises: an image trimming method according to the present invention, includes trimming the text image by using techknoledge in image processing and pattern recognition fields, and determining whether a trimmed quadrangle includes text region, thus more accurate trimmed text region can be obtained from trimmed candidate quadrangles, less manually cutting work is needed and the trouble of data missing because of the inaccurate trimming is saved.

DETAILED DESCRIPTION OF THE PREFERRED EMBODIMENTS

The preferred embodiments of the present invention will be described in detail with drawings.

The First Embodiment

Figure 1:
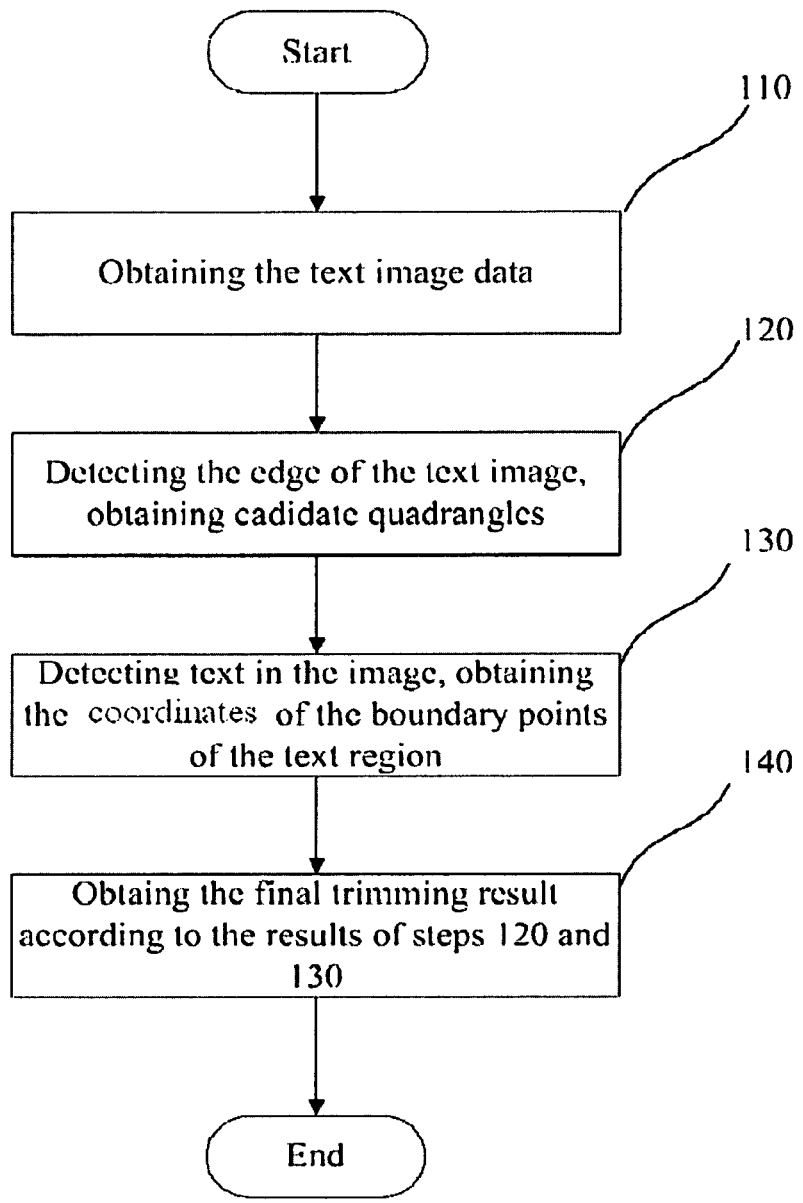
FIG. 1 illustrates the flow chart of the text image trimming method according to the present invention.

Please refer to FIG. 1, the present invention discloses a text image trimming method, the method comprises following steps:

Step 110: obtaining text image data.

The method of obtaining image data 110 comprises one of the following three methods:

A: taking the image by a DC;

B: scanning the image by a scanner;

C: opening an existing file that contains image data, reading the data in the file and decompressing the data with a standard algorithm.

Step 120: using straight line detection method to detect straight lines in the text image, and obtaining the edges of a trimmed quadrangle.

Figure 2:
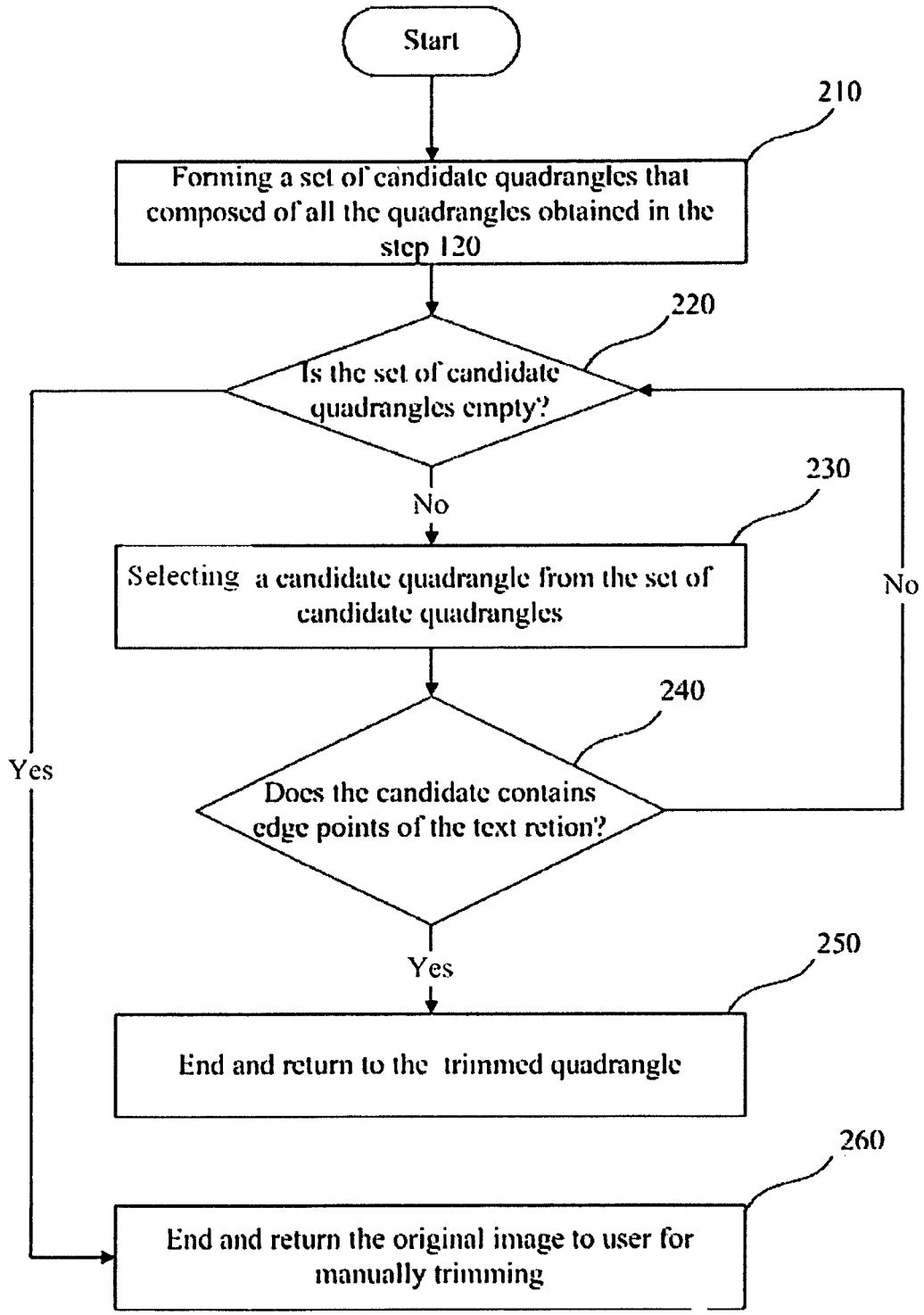
FIG. 2 illustrates the flow chart of the method that is used to determine whether the trimmed quadrangle is valid.

Step 130: detecting text in the image data, obtaining the coordinates of the boundary points of the text region;

Step 140: obtaining the final trimming result according to the results of steps 120 and 130;

Please refer to FIG. 2, the step 140 specially comprises the following steps:

Step 210, forming a set of candidate quadrangles that composed of all the quadrangles obtained in the step 120;

Step 220, if the set of candidate quadrangles is empty, go to step 260, otherwise, go to step 230;

Step 230, selecting a candidate quadrangle from the set of candidate quadrangles;

Step 240, determining if all the edge points of the text region are in the candidate quadrangle, if they are, judge the candidate quadrangle to be valid trimmed quadrangle and go to step 250, if they are not, go to step 220;

Step 250, returning to the valid trimmed quadrangle;

Step 260, returning the valid trimmed quadrangle to user for manually determining trimmed quadrangle.

Step 150: ending the method,

To sum up, the text image trimming method according to the present invention adopts the technowledge in image processing, pattern recognition, determines whether the trimmed quadrangle contains text region when trimming the text image, thereby obtaining accurate text region. By using the method, more accurate trimmed text region can be obtained from trimmed candidate quadrangles, less manually cutting work is needed and the trouble of data missing caused by inaccurate trimming is saved.

The Second Embodiment

Figure 3:
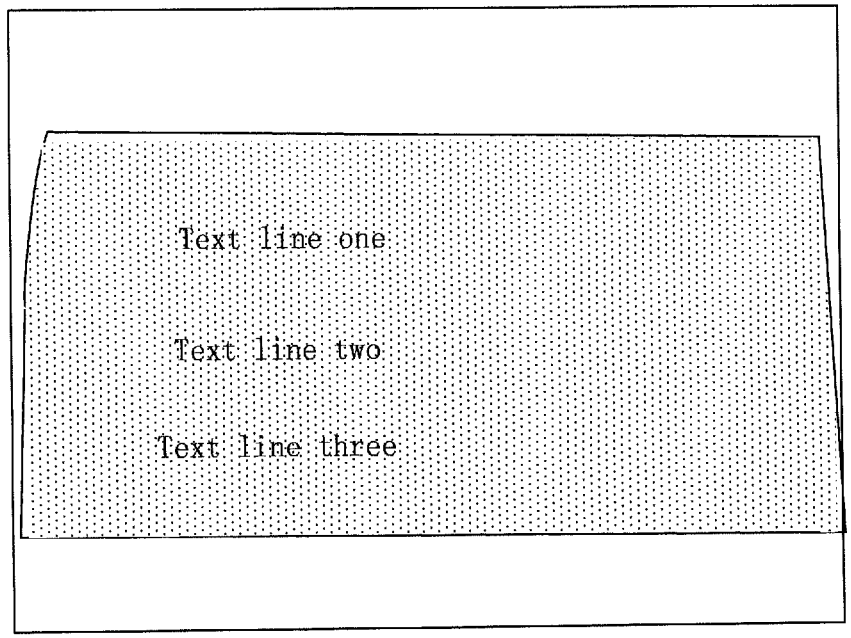
FIG. 3 illustrates the original text image.
Figure 4:
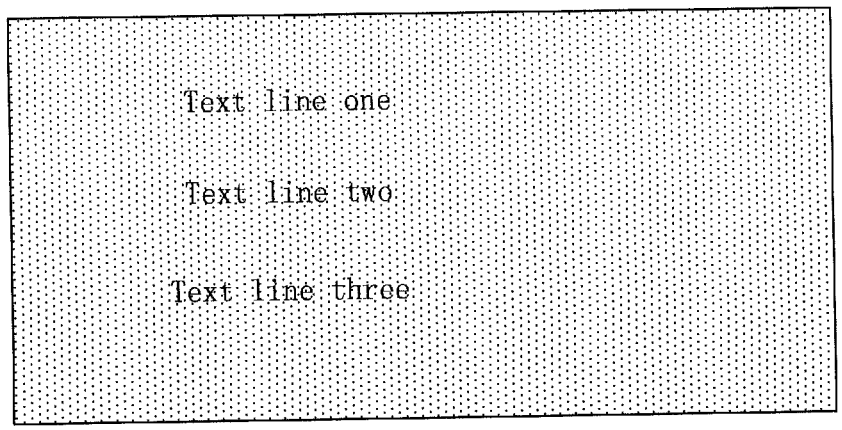
FIG. 4 illustrates the text image that is processed by using the text trimming method according to the present invention.

Generally, a image of a bill or notes in computer is as shown in FIG. 3, after using the method according to the present invention to read the data of the image, automatically trim, detect and correct the text region, the result text image is as shown in FIG. 4.

The Third Embodiment iPhone has a built-in digital camera of 3 million pixels, using the method according to the present invention to automatically trim, detect and correct the text image shot by the camera, a rectangle image can be obtained.

The description of the above embodiments is only to illustrate the principle and effect of the present invention, but is not intended to limit the present invention. Any persons skilled in the art can make modification or variation to the above embodiments without departing from the spirit and scope of the present invention. Any equivalent modification and change made by persons with ordinary skill in the art without departing from the spirit and technical thought disclosed in the present invention shall all fall within the scope of claims of the present invention.

What is claimed is:

1. A text image trimming method comprising:

obtaining text image data of a text image;

using a straight line detection method to detect straight lines in the text image; identifying and storing on a memory a set of trimmed quadrangles based on the detected straight lines, and obtaining edges of each of the trimmed quadrangles;

detecting text in the image data, identifying a text region based on the detected text, and obtaining coordinates of boundary points of the text region; and obtaining a final trimming result according to the obtained edges and coordinates, wherein obtaining the final trimming result comprises:

forming a set of candidate quadrangles composed of all obtained trimmed quadrangles;

if the set of candidate quadrangles is empty, asking a user for manually determining a trimmed quadrangle and ending the method;

if the set of candidate quadrangles is not empty, selecting a candidate quadrangle from the set of candidate quadrangles, and then determining if all the edge points of the text region are in the selected candidate quadrangle, thereafter:

if all the edge points of the text region are in the selected candidate quadrangle, setting the candidate quadrangle as a valid trimmed quadrangle, outputting the valid trimmed quadrangle and the ending the method; or if all the edge points of the text region are not in the selected candidate quadrangle, selecting a subsequent candidate quadrangle from the set of candidate quadrangles, and then determining if all the edge points of the text region are in the subsequently selected candidate quadrangle.

2. The text image trimming method according to claim 1, wherein obtaining text image data comprises one of the following three methods:

A: taking an image by a digital camera;

B: scanning an image by a scanner; or

C: opening an existing file that contains image data, reading the image data in the file and decompressing the image data.

3. The text image trimming method according to claim 1, wherein the method is performed by a computer, the computer having a storage that stores the obtained edges and coordinates.

4. The text image trimming method according to claim 3, further comprising:

correcting distortions in the text image data, by applying the valid trimming quadrangle, to generate a corrected image.

5. The text image trimming method according to claim 4, further comprising displaying the corrected image on a display device.

\* \* \* \* \*